United States Patent
Shiraga et al.

(10) Patent No.: US 10,036,303 B2
(45) Date of Patent: Jul. 31, 2018

(54) LAWN MOWER

(71) Applicant: Kubota Corporation, Osaka-shi (JP)

(72) Inventors: Takahiro Shiraga, Sakai (JP); Seiya Yoshida, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/606,012

(22) Filed: May 26, 2017

(65) Prior Publication Data

US 2018/0066570 A1 Mar. 8, 2018

(30) Foreign Application Priority Data

Sep. 2, 2016 (JP) .................................. 2016-172108

(51) Int. Cl.
| | |
|---|---|
| *F01P 11/12* | (2006.01) |
| *A01D 34/68* | (2006.01) |
| *F01P 11/10* | (2006.01) |
| *B60K 11/06* | (2006.01) |
| *F01P 11/06* | (2006.01) |
| *A01D 101/00* | (2006.01) |

(52) U.S. Cl.
CPC .......... *F01P 11/12* (2013.01); *A01D 34/6806* (2013.01); *B60K 11/06* (2013.01); *F01P 11/10* (2013.01); *A01D 34/68* (2013.01); *A01D 2034/6843* (2013.01); *A01D 2101/00* (2013.01); *F01P 11/06* (2013.01)

(58) Field of Classification Search
CPC ........... F01P 11/12; F01P 11/10; B60K 11/06; B60K 13/06; A01D 34/00; A01D 34/43
See application file for complete search history.

(56) References Cited

U.S. PATENT DOCUMENTS

| | | | | | |
|---|---|---|---|---|---|
| 5,207,187 | A | * | 5/1993 | Kurohara ............... | B60K 11/06 123/41.7 |
| 5,284,115 | A | * | 2/1994 | Imanishi ................ | B60K 11/00 123/198 E |
| 5,678,648 | A | * | 10/1997 | Imanishi ................ | B60K 11/08 180/68.1 |
| 5,689,953 | A | * | 11/1997 | Yamashita ............. | B60K 11/02 123/41.49 |
| 6,019,161 | A | * | 2/2000 | Travis .................... | B60K 11/08 165/41 |
| 6,192,839 | B1 | * | 2/2001 | Takeshita .............. | E02F 9/0866 123/41.49 |
| 9,469,189 | B2 | * | 10/2016 | Minoura ................ | B60K 13/04 |
| 9,596,804 | B2 | | 3/2017 | Asahara et al. | |
| 2010/0263609 | A1 | * | 10/2010 | Klejeski ................... | F01P 5/06 123/41.6 |

FOREIGN PATENT DOCUMENTS

JP 2016047023 A 4/2016

\* cited by examiner

*Primary Examiner* — Brian L Swenson
(74) *Attorney, Agent, or Firm* — The Webb Law Firm (57) ABSTRACT

A lawn mower includes a pair of left and right main frames 17, an engine E mounted to the pair of left and right main frames 17, a radiator for cooling water that cools the engine E, a cooling fan 11 for feeding cooling air to the radiator, and a hood 9 accommodating the engine E, the radiator and the cooling fan 11. An air deflector plate 34 is provided between the pair of left and right main frames 17 and configured to change direction of cooling exhaust air flowing toward a ground surface.

7 Claims, 8 Drawing Sheets

LAWN MOWER

CROSS-REFERENCE TO RELATED APPLICATION

This application claims priority to Japanese Patent Application No. 2016-172108 filed Sep. 2, 2016, the disclosure of which is hereby incorporated in its entirety by reference.

TECHNICAL FIELD

The present invention relates to a lawn mower including a pair of left and right main frames, an engine mounted to the pair of left and right main frames, a radiator for cooling water that cools the engine, a cooling fan for feeding cooling air to the radiator, and a hood accommodating the engine, the radiator and the cooling fan.

BACKGROUND ART

As an example of such lawn mower as described above, there is known a lawn mower disclosed by Patent Document 1 (Japanese Unexamined Patent Application Publication No. 2016-47023). The lawn mower disclosed by Patent Document 1 includes a pair of left and right main frames (referred to as "rear frame" in this document), an engine mounted to the pair of left and right main frames, a radiator for cooling water that cools the engine, a cooling fan for feeding cooling air to the radiator, and a hood accommodating the engine, the radiator and the cooling fan. With the lawn mower disclosed by Patent Document 1, the radiator, the engine, etc. accommodated in the hood are cooled by cooling air fed by the cooling fan. The cooling air after cooling the radiator, the engine, etc. (cooling exhaust air) is discharged to the outside of the hood.

SUMMARY OF THE INVENTION

Problem to be Solved by Invention

With the lawn mower disclosed by Patent Document 1, when the cooling exhaust air flows through between the pair of left and right main frames toward a ground surface, this cooling exhaust air comes into direct contact with the ground surface, thus inviting possibility of lawn's withering on stalk.

In view of the above-described situation, there is a need for a lawn mower capable of preventing such lawn's withering on stalk.

Solution

A lawn mower according to the present invention comprises:
 a pair of left and right main frames;
 an engine mounted to the pair of left and right main frames;
 a radiator for cooling water that cools the engine;
 a cooling fan for feeding cooling air to the radiator;
 a hood accommodating the engine, the radiator and the cooling fan; and
 an air deflector provided between the pair of left and right main frames and configured to change direction of cooling exhaust air flowing toward a ground surface.

With the above-described inventive arrangement, even when cooling exhaust air flows through between the pair of left and right main frames toward a ground surface, the direction of this cooling exhaust air is changed by the air deflector, so that direct contact of the cooling exhaust air to lawn on the ground surface can be avoided. Thus, lawn's withering on stalk can be prevented.

Further, preferably according to the present invention:
 the air deflector comprises a plate-like member that extends along a plane from one to the other of the pair of left and right main frames; and
 the air deflector is tilted to be disposed more downward as it approaches the other main frame.

With the above-described inventive arrangement, even when cut lawn clipping may drop onto the upper face of the air deflector, this clipping will drop onto the ground surface along the slope of the air deflector. This reduces the possibility of the lawn clipping or the like being accumulated on the upper face of the air deflector.

Further, preferably according to the present invention:
 at an end portion of the air deflector on the side of the other main frame, there is formed a downwardly bent portion.

With the above-described inventive arrangement, a corner of the end portion of the air deflector on the side of the other main frame is formed roundish. With this, even if a member (e.g. a harness) present in the periphery of the air deflector comes into contact with the end portion (corner portion) of the air deflector on the side of the other main frame, the possibility of damage to this member present in the periphery can be lessened.

Further, preferably according to the present invention:
 the air deflector is supported in cantilever manner to one main frame of the pair of left and right main frames.

Further, preferably according to the present invention:
 the air deflector includes a flat face portion that is tilted to be disposed more downward as it approaches from one to the other of the pair of left and right main frames and a perpendicular face portion that extends downwards from an end portion of the flat face portion on the side of the one main frame.

Still further, preferably according to the present invention:
 a lower end portion of the perpendicular face portion does not protrude downward beyond a lower end of the one main frame.

Still further, preferably according to the present invention:
 in a front/rear direction of a vehicle body, the flat face portion has a length longer than a length of the perpendicular face portion.

EMBODIMENTS

Next, embodiments of the present invention will be described with reference to the accompanying drawings.

Figure 1:
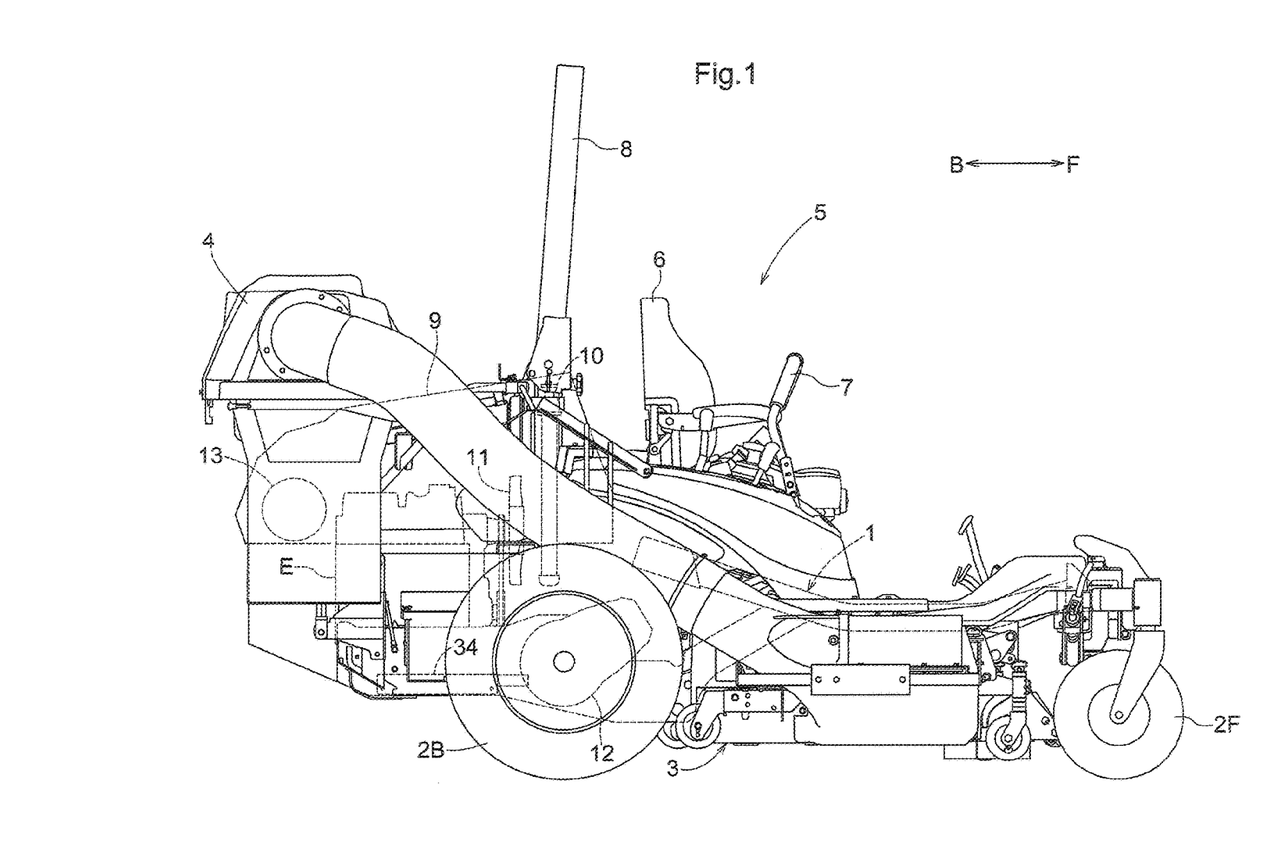
FIG. 1 is a right side view showing a lawn mower.
Figure 2:
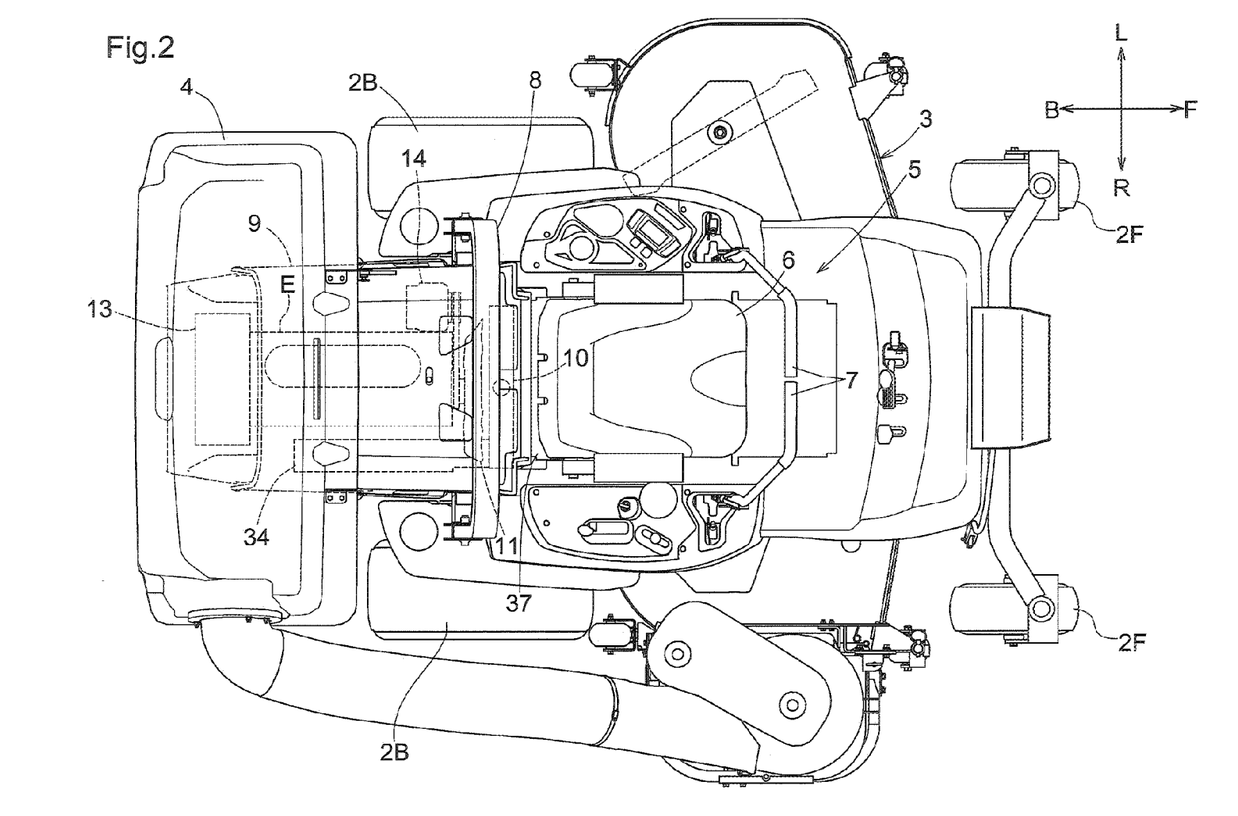
FIG. 2 is a plane view showing the lawn mower.

Incidentally in the following discussion, the direction denoted with arrow F shown in FIG. 1 and FIG. 2 represents "vehicle body front side", the direction denoted with arrow B shown in FIG. 1 and FIG. 2 represents "vehicle body rear side", the direction denoted with arrow L shown in FIG. 2 represents "vehicle body left side" and the direction denoted with arrow R shown in FIG. 2 represents "vehicle body right side", respectively.

[General Arrangement of Lawn Mower]

FIG. 1 and FIG. 2 show a mid-mount type lawn mower (riding lawn mower). This lawn mower includes a vehicle body frame 1. There are provided a pair of left and right front wheels 2F as driven wheels (canister type) and a pair of left and right rear wheels 2B as driving wheels. Between the front wheels 2F and the rear wheels 2B, a mower 3 is provided. At a rear end portion of the vehicle body frame 1, there is detachably mounted a lawn collector 4 for collecting lawn clippings from the mower 3.

At a front/rear center portion of the vehicle body frame 1, a driving section 5 is provided. In this driving section 5, there are provided a driver's seat 6 where a driver is to be seated and a pair of left and right control levers 7. At a rear portion of the driving section 5, there is provided a ROPS 8 having an approximately portal shape. Rearwardly of the driving section 5, a hood 9 is provided. The hood 9 accommodates an engine E, a radiator 10, and a cooling fan 11. Under the driving section 5, there is provided a speed changer device 12 for speed-changing power from the engine E.

[Inner Arrangement of Hood]

Figure 3:
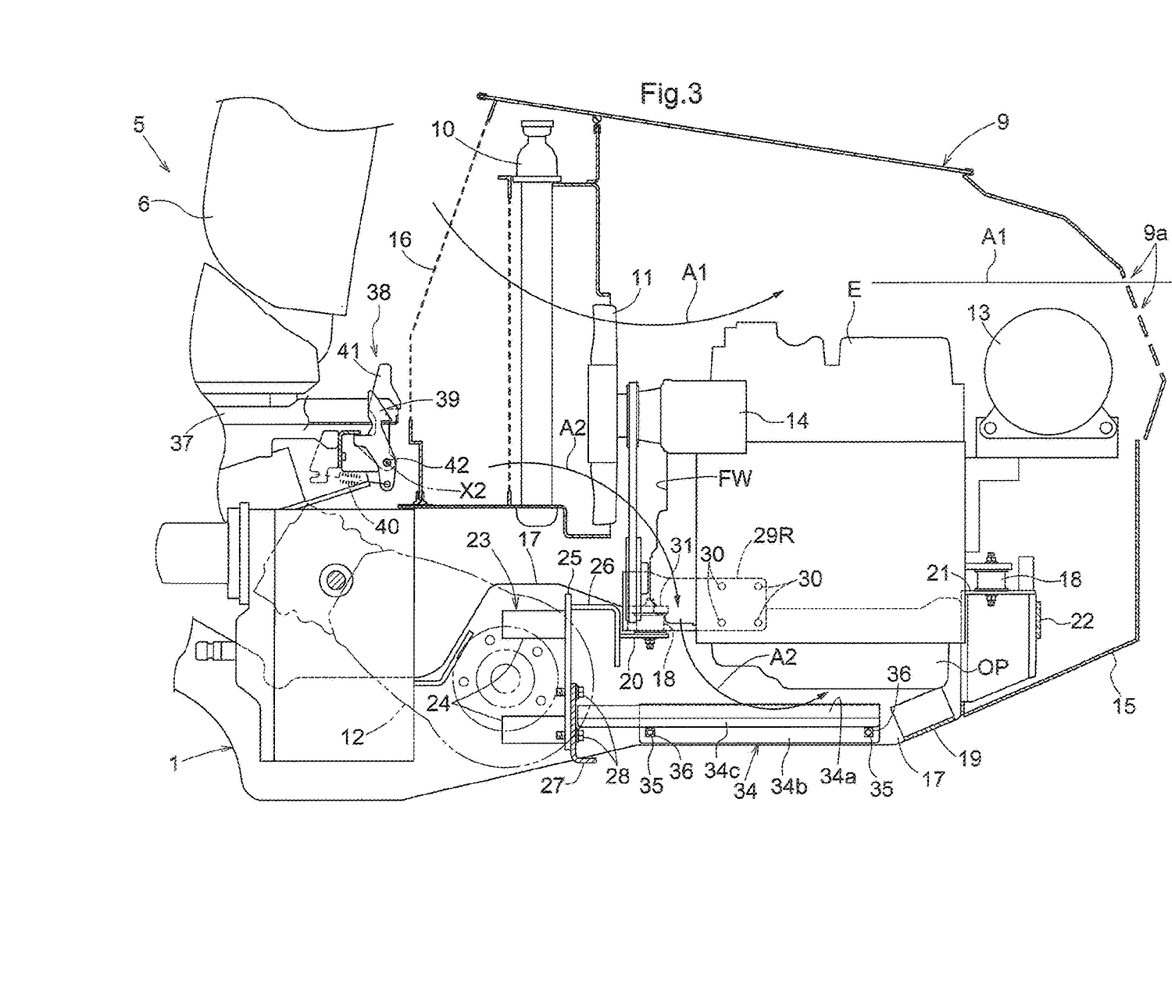
FIG. 3 is a left side view showing an inner arrangement of a hood.
Figure 4:
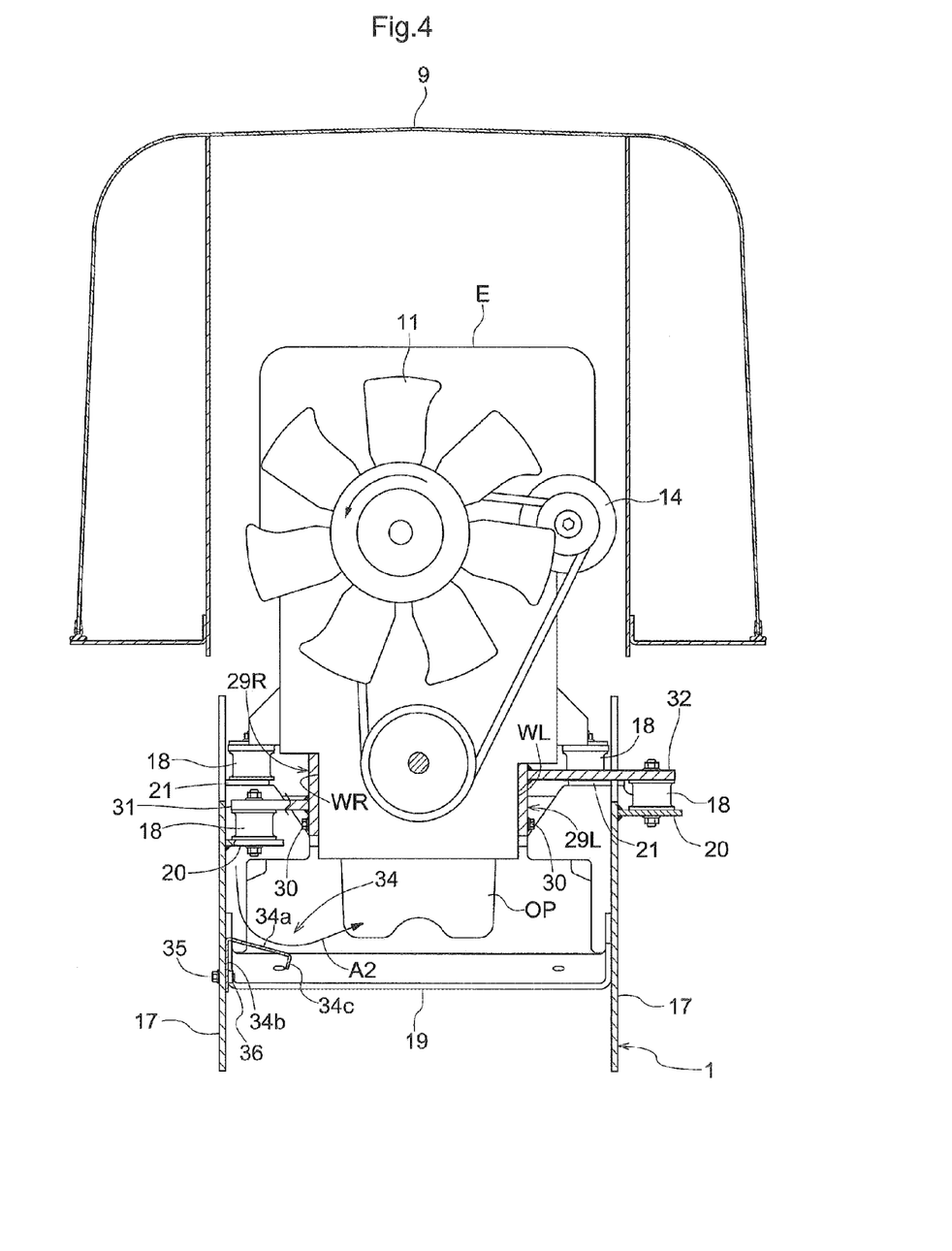
FIG. 4 is a front view showing the inner arrangement of the hood.
Figure 5:
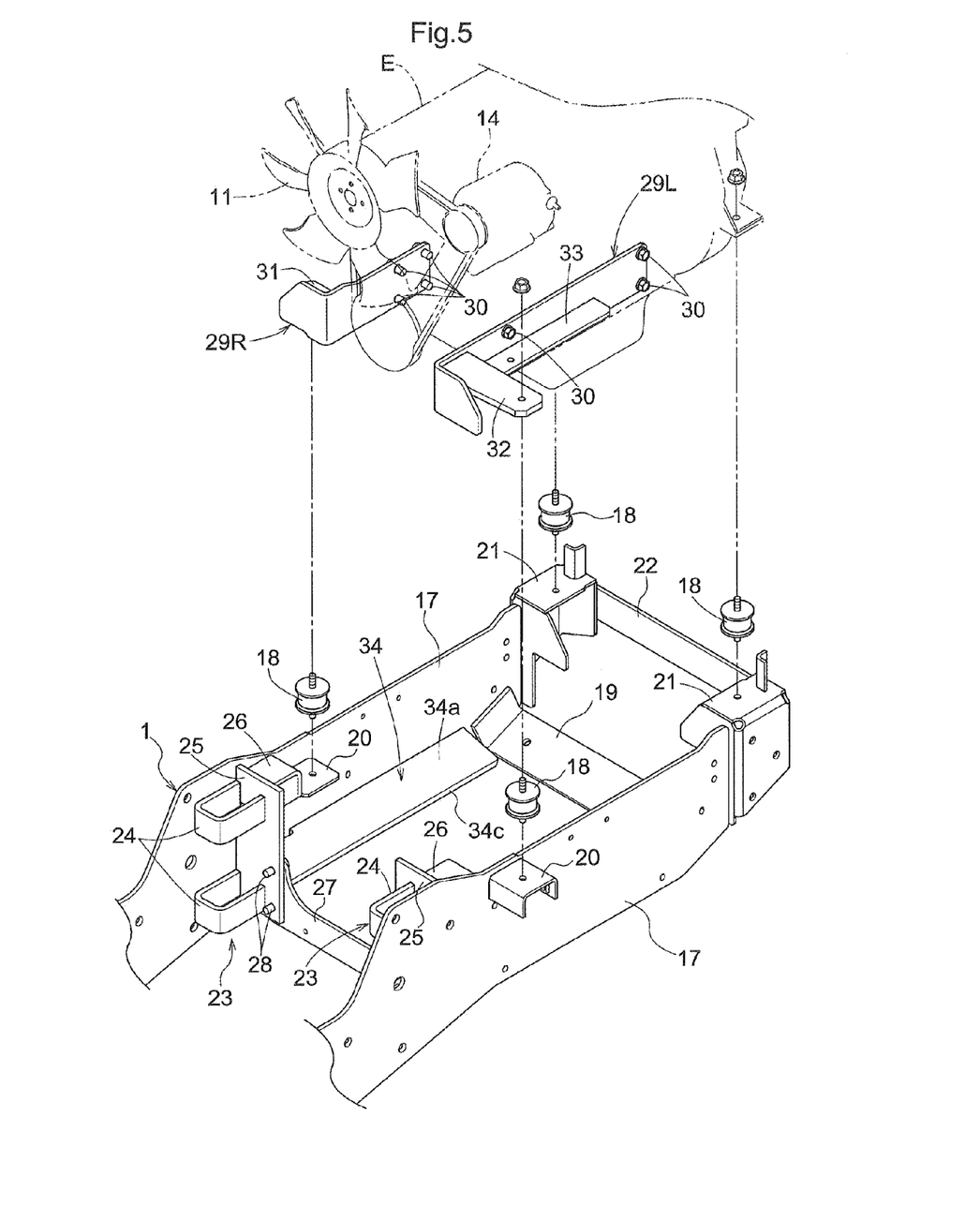
FIG. 5 is a perspective view showing a frame arrangement.
Figure 6:
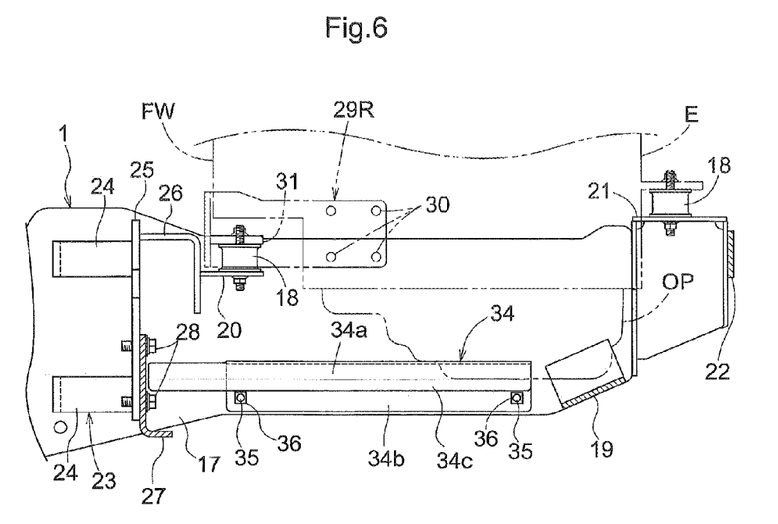
FIG. 6 is a left side view showing the frame arrangement.
Figure 7:
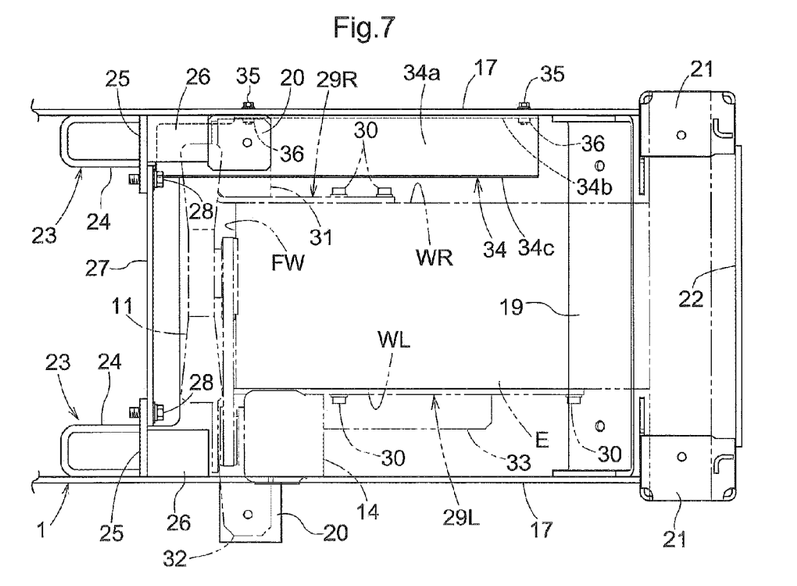
FIG. 7 is a plane view view showing the frame arrangement.

As shown in FIG. 3 and FIG. 4, forwardly of the engine E, there is provided the radiator 10 for cooling water for cooling the engine E. Forwardly of the engine E, the cooling fan 11 for feeding cooling air to the radiator 10 is provided. Rearwardly of the engine E, there is provided an exhaust air cleaning device (e.g. a DPF) 13 for cleaning exhaust air from the engine E. On the left side of the engine E, an alternator 14 is provided. A rear frame 15 is mounted to cover a rear portion of the engine E. To a front wall portion of the hood 9, there is attached a net 16 having air permeability. At a rear wall portion of the hood 9, there are formed a plurality of slits 9a for allowing air circulation.

[Frame Arrangement]

As shown in FIGS. 3 through 7, the vehicle body frame 1 includes a pair of left and right main frames 17 that extend along the vehicle body front/rear direction. The engine E is mounted to the pair of left and right main frames 17 via mounting rubbers 18. Between the rear end portion of the left main frame 17 and the rear end portion of the right main frame 17, a rear plate 19 is provided. Each main frame 17 includes a front mounting bracket 20 and a rear mounting bracket 21. To these front and rear mounting brackets 20, 21, the mounting rubbers 18 are fixedly attached. Between the left rear mounting bracket 21 and the right rear mounting bracket 21, a plate 22 is provide.

The left front mounting bracket 20 is fixed (e.g. fixed by welding) to a left side face (vehicle body outer face) of the left main frame 17. The left rear mounting bracket 21 is fixed (e.g. fixed by welding) to a rear end face of the left main frame 17. The right front mounting bracket 20 is fixed (e.g. fixed by welding) to a left side face (vehicle body inner face) of the right main frame 17. The right rear mounting bracket 21 is fixed (e.g. fixed by welding) to a rear end face of the right main frame 17.

A pair of left and right ROPS supporting frames 23 are provided for supporting the ROPS 8. The ROPS supporting frames 23 include a pair of upper and lower brackets 24 and plates 25. Between upper end portions of the plates 25 and the main frames 17, reinforcing brackets 26 are provided.

The bracket 24 is fixed (e.g. fixed by welding) to the front face of the corresponding plate 25. The left plate 25 is fixed (e.g. fixed by welding) to a right side face (vehicle body inner face) of the left main frame 17. The right plate 25 is fixed (e.g. fixed by welding) to a left side face (vehicle body inner face) of the right main frame 17. Between the lower end portion of the left plate 25 and the lower end portion of the right plate 25, a lower plate 27 is provided. Left and right respective opposed ends of the lower plate 27 are fixed to the left plate 25 and the right plate 25, respectively with bolts 28.

To a left side wall WL and a right side wall WR of the engine E, there are fixed respectively a left engine supporting frame 29L and a right engine supporting frame 29R with bolts 30. At a front end portion of the right engine supporting frame 29R, there is provided an attaching stay 31 to which the mounting rubber 18 is attached. At a front end portion of the right engine supporting frame 29R, there is provided an attaching stay 31 to which the mounting rubber 18 is attached. At a front end portion of the left engine supporting frame 29L, there is provided an attaching stay 32 to which the mounting rubber 18 is attached. To a left side face (vehicle body outer face) of the left engine supporting frame 29L, a plate 33 is fixed (e.g. fixed by welding). This plate 33 extends along a plane along the vehicle body front/rear direction.

[Air Deflector Plate]

As shown in FIGS. 3 through 7, between the pair of left and right main frames 17, there is provided an air deflector plate 34 (corresponding to "air deflector" relating to the present invention) for changing direction of cooling exhaust air (cooling air after cooling the radiator 10, the engine E, etc.) which flows toward a ground surface. The air deflector plate 34 is provided between the pair of left and right main frames 17 and on the side of the right main frame 17. Namely, the air deflector plate 34 is disposed with an offset to the right side from the left/right center between the pair of left and right main frames 17. More particularly, the air deflector plate 34 is disposed with an offset to the right side from the right side wall WR of the engine E and is supported in cantilever-wise to this right main frame 17. The air deflector plate 34 is fixed (fixed at two front and rear positions) to the left side face (vehicle body inner face) of the right main frame 17 with bolts 35.

The air deflector plate 34 is disposed more downward than the lower end of the engine E (oil pan OP) in the vertical direction. The air deflector plate 34 extends, in the vehicle body front/rear direction, across an approximately entire region between the plate 25 and the rear plate 19. The front end portion of the air deflector plate 34 extends more to the front side than a front wall FW of the engine E. The front end portion of the air deflector plate 34 is overlapped with the right front mounting bracket 20 and the right reinforcing bracket 26 as seen in a plane view. The rear end portion of the air deflector plate 34 extends rearwards to a position corresponding to the rear end of the engine E.

The air deflector plate 34 includes a flat face portion 34a and a perpendicular face portion 34b. The flat face portion 34a extends along a plane from the right main frame 17 toward the left main frame 17. The perpendicular face portion 34b extends downward from the right end portion of the flat face portion 34a. The lower end portion of the perpendicular face portion 34b does not protrude downwards beyond the lower end of the right main frame 17. In the perpendicular face portion 34b, there are provided welded nuts 36 corresponding to the bolts 35. The flat face portion 34a is tilted such that this portion 34a is located more downwards as it approaches the left main frame 17 (that is, tilted downwards to the left). At the left end portion of the flat face portion 34a, there is formed a bent portion 34c (formed by a bending work) which is bent downwards. Corner portions of the flat face portion 34a and the bent portion 34c are formed roundish.

With the above-described arrangement, as shown in FIG. 3, as ambient air is introduced through the net 16 to the inside of the hood 9 in association with rotation of the cooling fan 11, the radiator 11, the engine E etc. accommodated inside the hood 9 are cooled by cooling air generated by the cooling fan 11. The cooling air after cooling the radiator 10, the engine E, etc. (cooling exhaust air) is discharged through the slits 9a to the outside of the hood 9 (see cooling exhaust air A1 shown in FIG. 3).

In the above, even if cooling exhaust air (see cooling exhaust air A2 shown in FIG. 3 and FIG. 4) flows through between the right main frame 17 and the right side wall WR of the engine E toward the ground surface, as the direction of this cooling exhaust air is changed by the air deflector plate 34, there occurs no direct contact between the cooling exhaust air and lawn on the ground surface. Consequently, it is possible to prevent lawn withering on stalk by the cooling exhaust air. More particularly, as the cooling exhaust air hits the air deflector plate 34, this cooling exhaust air will be diffused, so that reduction of the wind velocity and temperature of the cooling exhaust air is made possible. Incidentally, the cooling exhaust airs A1, A2 shown in FIGS. 3 and 4 are just examples, but may be slightly different from flowing of actual cooling exhaust air.

[Pivoting Arrangement of Seat Base]

Figure 8:
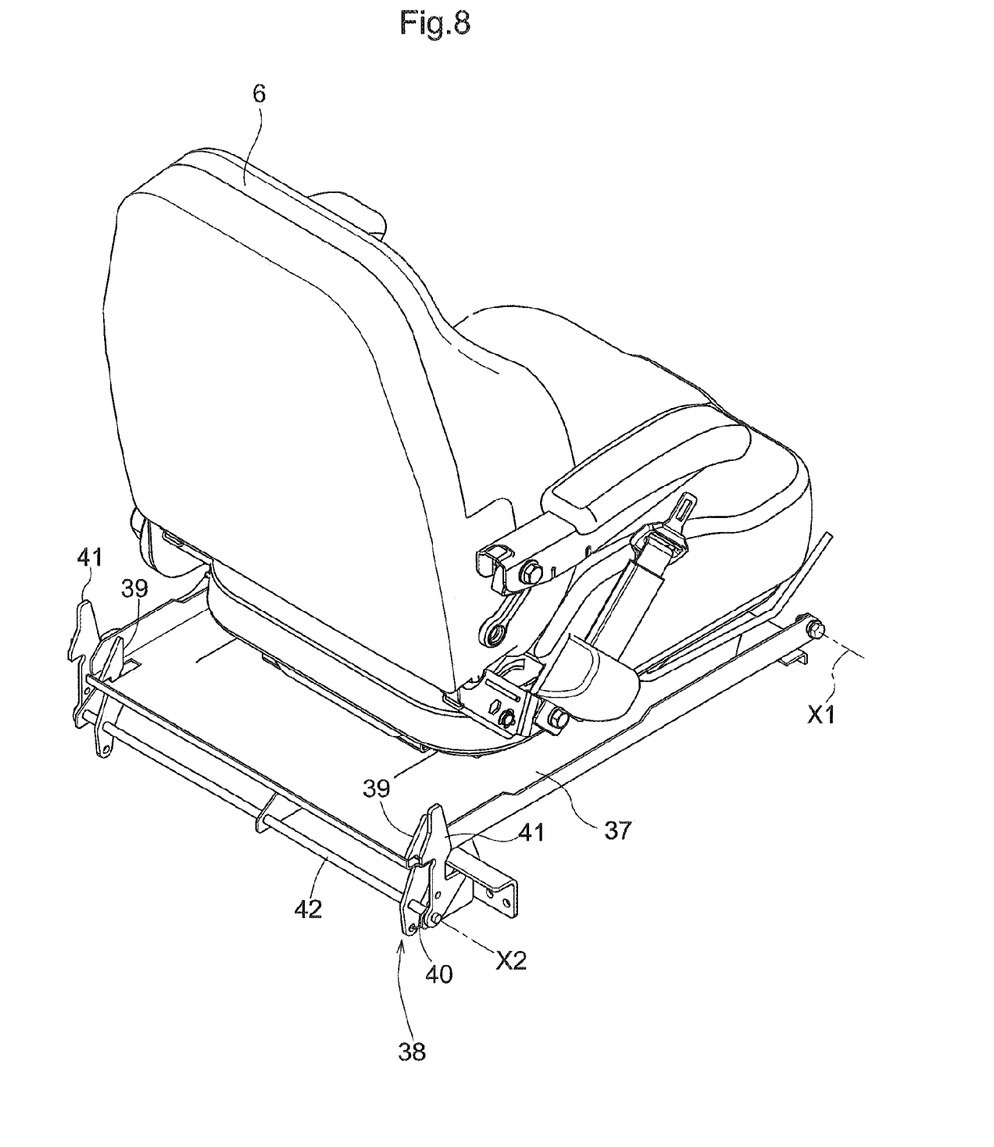
FIG. 8 is a perspective view showing a pivoting arrangement of a seat base.
Figure 9:
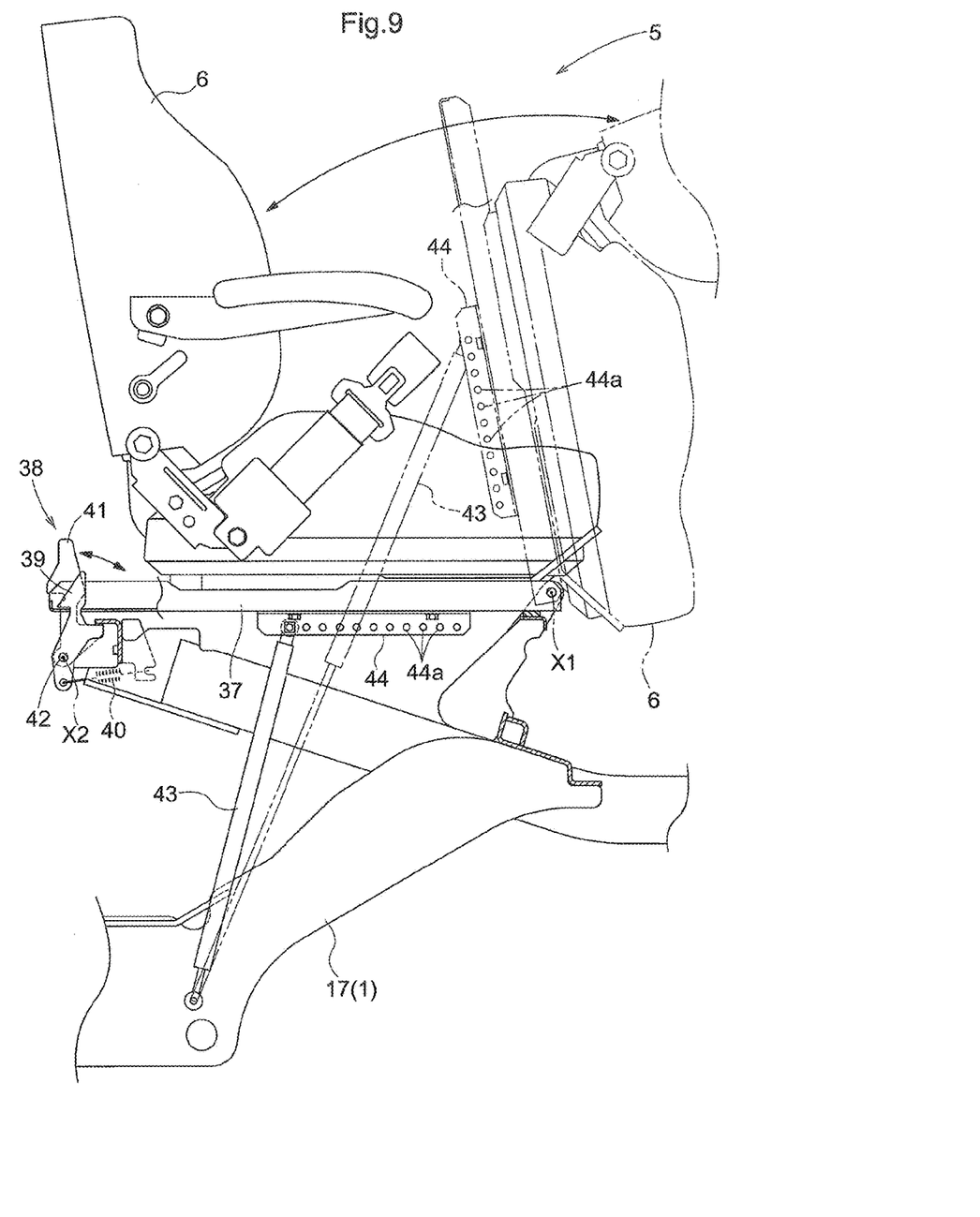
FIG. 9 is a right side view showing the pivoting arrangement of the seat base.

As show in FIG. 8 and FIG. 9, the driver's seat 6 is supported to a seat base 37. This seat base 37 is vertically pivotable about a front pivot X1 between a closed position for covering the inside of the seat base 37 and an opened position for opening up the inside of the seat base 37.

There is provided a lock mechanism 38 capable of locking the seat base 37 at the closed position. The lock mechanism 38 includes a pair of left and right lock hooks 39, a lock spring 40 and a pair of left and right operational levers 41.

Each lock hook 39 is pivotable about an axis X2 extending along the vehicle body left/right direction between an engaging position for engagement with the seat base 37 and a non-engaging position for non-engagement with the seat base 37. With establishment of engagement of the lock hook 39 with the seat base 37, the seat base 37 is locked at the closed position. The left lock hook 39 and the right lock hook 39 are operably coupled to each other to be pivotable in unison by means of a lock rod 42. The lock spring 40 urges the lock hook 39 to pivot this hook 39 about the axis X2 toward the engaged position.

The left operational lever 41 and the right operational lever 41 are fixed respectively to left and right opposed end portions of the lock rod 42. By the operational levers 41, the lock hook 39 can be operated to be pivoted about the axis x2 toward the non-engaging position via the lock rod 42.

Between the seat base 37 and the main frames 17, there is provided a dumper (e.g. a gas dumper) 43 for urging upwardly the seat base 37 about the front pivot X1 toward the opened position. An end portion of the dumper 43 on the side of the seat base 37 is attached to a stay 44. The stay 44 defines a plurality of attaching holes 44a for allowing attachment of the seat base 37 side end portion of the dumper 43. By changing the attaching hole 44a to which the seat base 47 side end portion of the dumper 43 is to be attached, an urging force (assisting force) of the dumper 43 can be adjusted. For instance, the urging force (assisting force) of the dumper 43 can be set such that the seat base 37 will not be pivoted upwards automatically, when the locking of the seat base 37 to the closed position by the locking mechanism 38 is released.

With the above-described arrangement, for instance, when a maintenance of the inside of the seat base 37 is to be effected, locking of the seat base 37 to the closed position by the lock mechanism 38 will be released, whereby with the assisting force from the dumper 43, the seat base 37 can be readily pivoted to the opened position. In this embodiment, an arrangement is provided such that the seat base 37 is locked at the opened position by an expansion limit of the dumper 43. However, it is also possible to provide a further locking mechanism capable of locking the seat base 37 to the opened position.

Other Embodiments (1) In the foregoing embodiment, the air deflector plate 34 is provided on the right main frame 17 side, between the pair of left and right main frames 17. Instead of this or in addition to this, the air defector plate 34 can be provided on the left main frame 17 side, between the pair of left and right main frames 17. Or, such air deflector plate can be provided between the pair of left and right main frames 17.

(2) In the foregoing embodiment, the air deflector plate 34 (flat face portion 34a) is tilted to be disposed more downward as it approaches the left main frame 17. However, the air deflector plate 34 may not be tilted in such manner.

(3) In the foregoing embodiment, at the left end portion of the air deflector plate 34 (flat face portion 34a), the bent portion 34c is formed. However, such bent portion 34c may be omitted.

(4) The present invention is applicable not only to the mid-mount type lawn mower, but also to a front-mount type lawn mower.

The invention claimed is:

1. A lawn mower comprising:
a pair of left and right main frames;
an engine mounted to the pair of left and right main frames;
a radiator for cooling water that cools the engine;
a cooling fan for feeding cooling air to the radiator;
a hood accommodating the engine, the radiator and the cooling fan; and
an air deflector provided between the pair of left and right main frames and configured to change direction of cooling exhaust air flowing toward a ground surface,
wherein in plan view, the air deflector is provided between one of the pair of left and right main frames and a lateral side wall of the engine associated with the one of the pair of left and right main frames.

2. A lawn mower comprising:
a pair of left and right main frames;
an engine mounted to the pair of left and right main frames;
a radiator for cooling water that cools the engine;
a cooling fan for feeding cooling air to the radiator;
a hood accommodating the engine, the radiator and the cooling fan; and
an air deflector provided between the pair of left and right main frames and configured to change direction of cooling exhaust air flowing toward a ground surface, wherein the air deflector comprises a plate-like member that extends along a plane from one to the other of the pair of left and right main frames; and the air deflector is tilted to be disposed more downward as it approaches the other main frame.

3. The lawn mower of claim 2, wherein at an end portion of the air deflector on the side of the other main frame, there is formed a downwardly bent portion.

4. A lawn mower comprising:
a pair of left and right main frames;
an engine mounted to the pair of left and right main frames;
a radiator for cooling water that cools the engine;
a cooling fan for feeding cooling air to the radiator;
a hood accommodating the engine, the radiator and the cooling fan; and
an air deflector provided between the pair of left and right main frames and configured to change direction of cooling exhaust air flowing toward a ground surface,
wherein the air deflector is supported in cantilever manner to one main frame of the pair of left and right main frames.

5. A lawn mower comprising:
a pair of left and right main frames;
an engine mounted to the pair of left and right main frames;
a radiator for cooling water that cools the engine;
a cooling fan for feeding cooling air to the radiator;
a hood accommodating the engine, the radiator and the cooling fan; and
an air deflector provided between the pair of left and right main frames and configured to change direction of cooling exhaust air flowing toward a ground surface,
wherein the air deflector includes a flat face portion that is tilted to be disposed more downward as it approaches from one to the other of the pair of left and right main frames and a perpendicular face portion that extends downwards from an end portion of the flat face portion on the side of the one main frame.

6. The lawn mower of claim 5, wherein a lower end portion of the perpendicular face portion does not protrude downward beyond a lower end of the one main frame.

7. The lawn mower of claim 5, wherein in a front/rear direction of a vehicle body, the flat face portion has a length longer than a length of the perpendicular face portion.

* * * * *